United States Patent
Sankar et al.

(10) Patent No.: US 10,915,554 B2
(45) Date of Patent: Feb. 9, 2021

(54) DATABASE REPLICATION SYSTEM

(71) Applicant: PAYPAL, INC., San Jose, CA (US)

(72) Inventors: Varun Sankar, San Jose, CA (US); Abhishek Prakash Kharche, San Jose, CA (US); Amit Parshuram Athavale, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 315 days.

(21) Appl. No.: 15/988,724

(22) Filed: May 24, 2018

(65) Prior Publication Data

US 2019/0362015 A1    Nov. 28, 2019

(51) Int. Cl.
G06F 16/00 (2019.01)
G06F 16/27 (2019.01)

(52) U.S. Cl.
CPC .................. *G06F 16/273* (2019.01)

(58) Field of Classification Search
None
See application file for complete search history.

(56) References Cited

U.S. PATENT DOCUMENTS

| | | | |
|---|---|---|---|
| 8,037,024 B1* | 10/2011 | Bozkaya | G06F 16/275 707/637 |
| 2016/0308982 A1* | 10/2016 | Greene | G06Q 10/1093 |
| 2016/0373292 A1* | 12/2016 | Sigoure | H04L 41/0856 |
| 2017/0085634 A1* | 3/2017 | Guney | G06F 16/24554 |
| 2017/0103116 A1* | 4/2017 | Hu | G06F 16/2471 |
| 2019/0057028 A1* | 2/2019 | D'Halluin | G06F 16/27 |
| 2019/0102476 A1* | 4/2019 | Liu | G06F 16/2471 |
| 2019/0213175 A1* | 7/2019 | Kong | G06F 16/1827 |

* cited by examiner

*Primary Examiner* — Son T Hoang
(74) *Attorney, Agent, or Firm* — Haynes and Boone, LLP

(57) ABSTRACT

Database replication is provided by accessing, by a subscribing application, a message queue through a messaging queue manager. The subscribing application obtains a message provided by a publishing application from the message queue. The message includes message data that corresponds to shard data in a shard database. The subscribing application then provides the message data included in the message to a de-shard database as de-shard data. The de-shard data is an instance of the shard data and is modifiable by the subscribing application without changing the shard data.

20 Claims, 6 Drawing Sheets

DATABASE REPLICATION SYSTEM

BACKGROUND

The present disclosure generally relates to database replication, and more specifically, replicating a shard database to a de-shard database using a messaging queue service according to various embodiments.

Service providers, such as payment service providers, generate large amounts of data such as, for example, user account information, merchant information, payment information, and other information that require storage such that the data is accessible at a later time. Storing this data to a single database is often not practical. The larger the database becomes, the time it takes to retrieve the data exponentially increases. Thus, payer service providers and other service providers often improve scalability of a data layer by sharding the data at an application level to a plurality of database shards that may each be implemented by a different storage system. The data of the database may be provided to each database shard based on some attribute of the data (i.e., a shard key). For example, the data may be assigned to a database shard based on location, a value within the data that is provided in a range such that a portion of the range may be provided on one database shard while another portion of the range may be provided on another database shard, and/or any other known sharding techniques.

However, certain applications may require all of the data to be co-located in one single database instance such as, for example applications that perform an extract, transform, load (ETL) process or applications that may search data using SQL IN queries as opposed to lookup queries. To provide the signal database instance of the data (i.e., a de-shard database), replication from the shard database of the multiple database shards to the de-shard database may be required.

Figure 1:
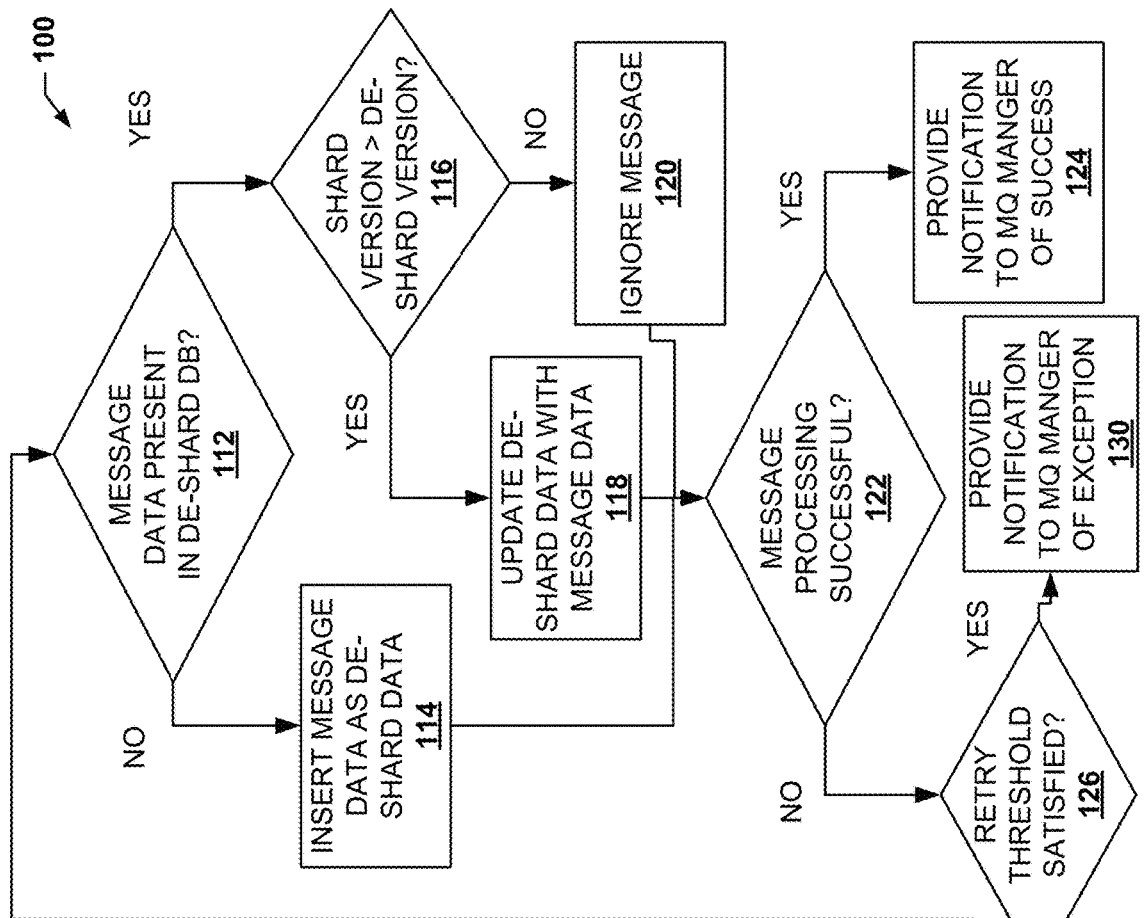
FIG. 1 is a flow chart illustrating an embodiment of a method for database replication.
Figure 1:
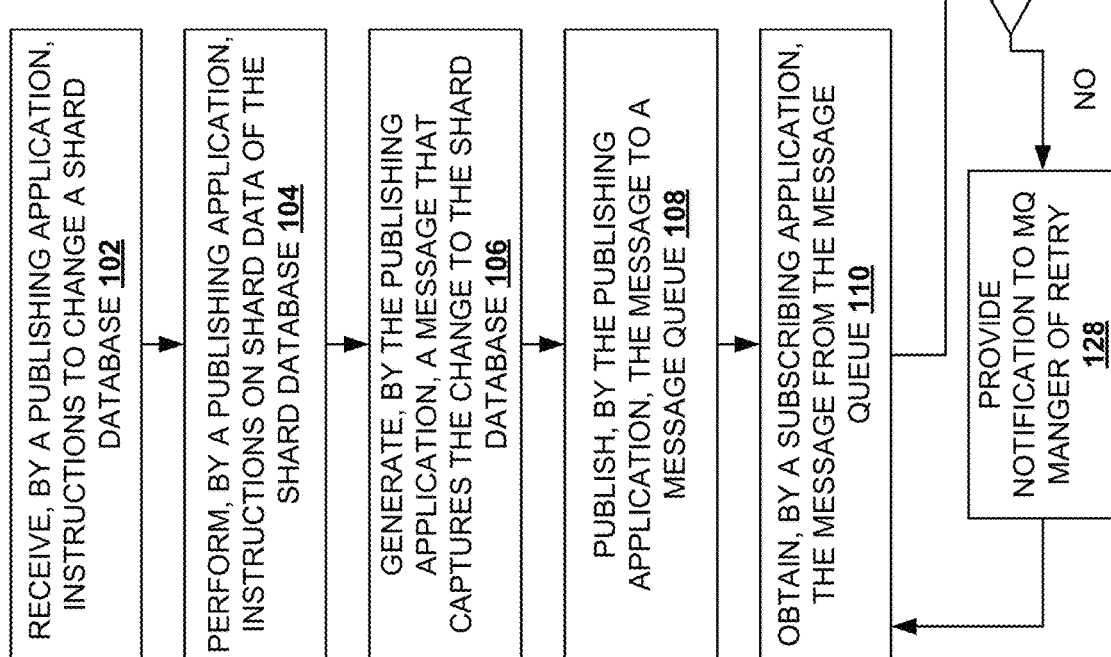

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Embodiments of the present disclosure include systems and methods for providing a database replication system. As discussed above, service providers, such as payment service providers, generate large amounts of data that require storage such that the data is retrievable at a later time. Storing this data to a single database is not often practical. Thus, payer service providers and other service providers often improve scalability of a data layer by sharding the data at an application level to a plurality of database shards that may each be implemented by a different storage system.

However, certain applications may require all of the data to be co-located in one single database instance such as, for example applications that perform an extract, transform, load (ETL) process or applications that may search data using structured query language (SQL) IN queries as opposed to lookup queries. To provide the signal database instance of the data (i.e., a de-shard database), replication from the shard database of the multiple database shards to the de-shard database is required. Several solutions to replicating shard databases to a shard database have been created. For example, Oracle Golden Gate™ provides solutions to replicating a shard database to a shard database. However, these types of solution may not allow custom replication for changing the schema of the shard data or the data provided by the shard data as it is being replicated into a de-shard database which may store data in a different structure than that of the shard database. Two phase commit is another database replication solution that allows custom replication. However, two phase commit requires synchronous replication and thus has high latency. Furthermore, two phase commit is highly complex and the replication logic may be less efficient than that of other approaches. Other database replication solutions include non-transactional queuing technology. However, these database solutions may also result in relatively high complexity and low efficiency.

Therefore, as discussed below, the systems and methods of the present disclosure provide a database replication system that includes a first application that provides updates to a shard database and generates a message regarding those updates to the shard database. The application publishes the message to a topic in a message queue managed by a message-oriented middleware service. A second application, which is subscribed to the topic in the message queue, receives the message from the message queue and uses the data provided in the message to update the de-shard database. The systems and methods of the present disclosure provide a database replication system that may be asynchronous and consistent. The database replication system also provides a database replication solution that is relatively less complex, has lower latency and is more efficient than two-phase commit and/or non-transactional queuing technology due to database queues being transactional to shard database changes. The database replication system also provides a database replication solution also allows custom replication without increasing the complexity and decreasing the efficiency of the database replication system when custom replication is provided via third party tools.

Referring now to FIGS. 1, 2, 3, 4 and 5, a method 100 for providing database replication is illustrated. In some embodiments of the method 100 described below, one or more service provider devices and client devices may operate to perform the method 100. For example, a message queue may be established that includes published messages from an application. The messages may include message data that corresponds to changes to shard data stored in a shard database made by the application. From the message data, a subscribing application that is subscribed to the published messages may obtain the messages from the message queue and make those changes to a de-shard database that is a single database instance of database shards provided in the shard database. For example, a payment service provider such as, for example, PayPal, Inc. of San Jose, Calif., may utilize a payment service provider device to perform the method 100 discussed below, and in some embodiments may operate in cooperation with one or more other system providers (via their system provider devices) and/or payees (via their user devices) to perform the method 100 discussed below. However, these embodiments are meant to be merely examples, and one of skill in the art in possession of the present disclosure will recognize that a wide variety of service providers and users may operate, alone or together, to provide the systems and methods discussed herein without departing from the scope of the present disclosure.

Figure 2:
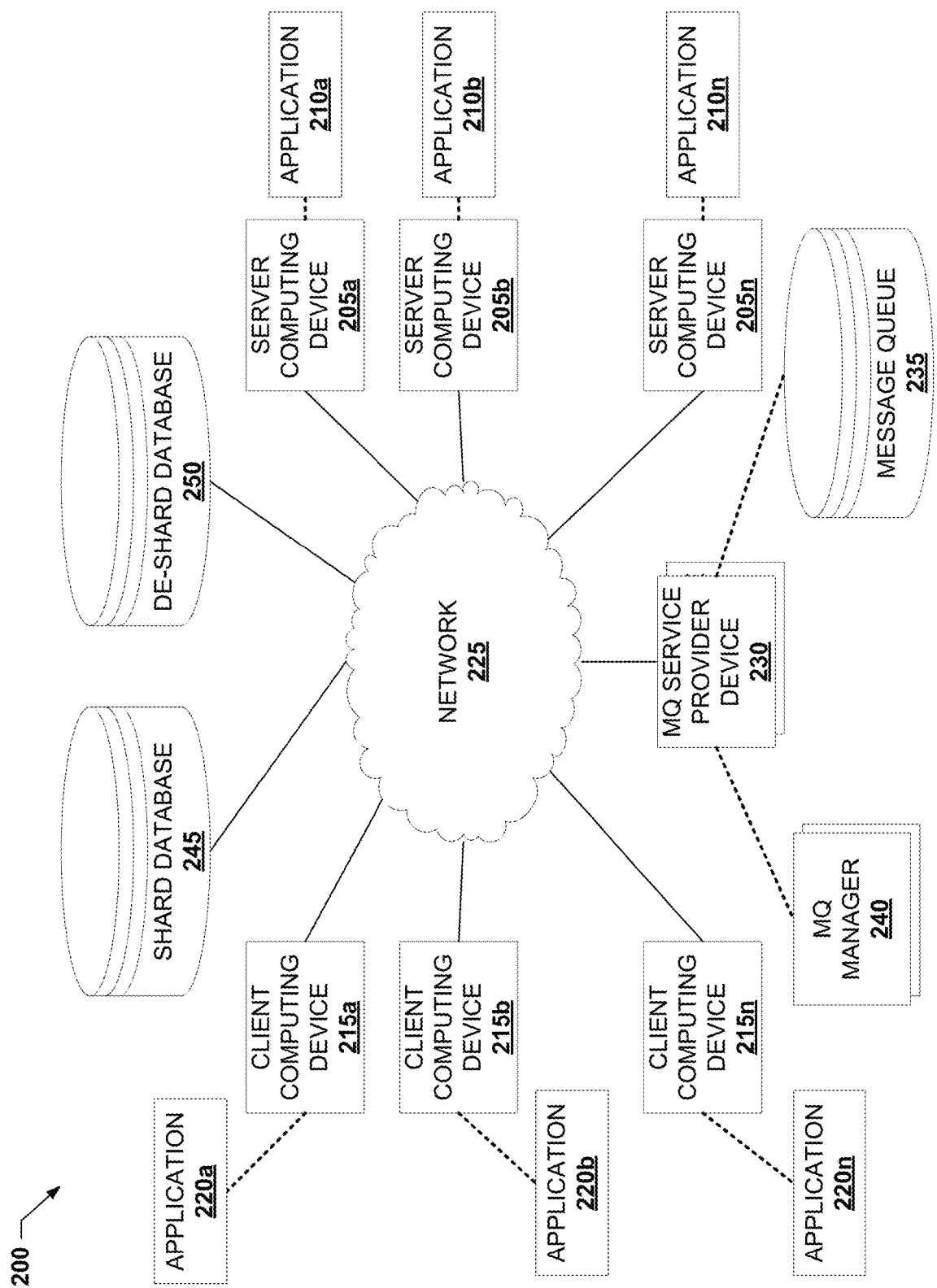
FIG. 2 is a schematic view illustrating an embodiment of a database replication system.

Referring now to FIG. 2, an embodiment of a database replication system 200 is illustrated. While the embodiment illustrated in FIG. 2 provides an example of a use of the database replication system 200 of the present disclosure in supporting application access to a messaging queue service for database replication between a shard database and a de-shard database, one of skill in the art in possession of the present disclosure will recognize that application access to a messaging queue service may be provided for a different numbers of devices, a variety of different types of devices, and a variety of different configurations of devices (e.g., different messaging queue configuration topologies), while remaining within the scope of the present disclosure. The database replication system 200 may include one or more server computing devices (e.g., server devices 205a, 205b, and up to 205n). For example, the server computing devices 205a-205n may include one or more server devices and/or other computing devices (e.g., desktop computing device(s), laptop/notebook computing device(s), tablet computing device(s), mobile phone(s), etc.) known in the art. Each of the server computing devices 205a-205n may host and/or otherwise provide for the execution of one or more applications 210a, 210b, and 210n, respectively (e.g., an application for completing transactions, web chat communication applications, debugging applications, video encoding applications, e-mail applications, social media applications, customer support applications, reservation booking applications, order management applications, manufacturing applications, order fulfillment and management applications, shipping applications, and/or other applications that would be apparent to one of skill in the art in possession of the present disclosure) that utilize the database replication system 200.

The database replication system 200 may also include one or more client computing devices (e.g., client computing devices 215a, 215b, and up to 215n). For example, the client computing devices 215a-215n may include one or more client devices, server devices, and/or other computing devices (e.g., desktop computing device(s), laptop/notebook computing device(s), tablet computing device(s), mobile phone(s), etc.) known in the art. Each of the client computing devices 215a-215n may host or otherwise provide for the execution of one or more applications 220a, 220b, and 210n, respectively. In an embodiment, the one or more of the applications 210a-210n hosted by the server computing device 205a-205n may be accessed through the client computing devices 215a-215n to send and/or retrieve messages over a network 225 such as, for example, the Internet, a Local Area Network, and/or other networks known in the art, using cellular communication techniques, WiFi communication techniques, and/or other communication techniques known in the art. Further, individual ones of the client computing devices 215a-215n may be coupled to one another over the network 225 such that the applications 220a-220n may provide messages to each other as well.

The database replication system 200 also includes a messaging queue service provider device 230. For example, the messaging queue (MQ) service provider device 230 may include one or more computing devices (e.g., desktop computing device(s), laptop/notebook computing device(s), tablet computing device(s), mobile phone(s), etc.) known in the art. As illustrated in FIG. 2, the messaging queue service provider device 230 may be communicatively coupled to the server computing devices 205a-205n and client computing devices 215a-215n through the network 225. The messaging queue service provider device 230 may host or otherwise provide one or more message-oriented middleware applications that are provided by different vendors and that may each support the operation of one or more message queues 235 that are managed by one or more message queue managers 240, discussed in further detail below. In this regard, the message queue managers 240 may be computer programs executed by one or more of the processors in the messaging queue service provider device 230 (e.g., via instructions on a non-transitory memory in the messaging queue service provider device 230) to manage receipt of and/or access to messages in the message queue 235 through the network 225 by different ones of the applications 210 and/or 220. Further, each of the messages in the message queue 235 may include content that is included in a body of the message, as well as a header portion of the message, and that is used by the message queue manager 240 to determine how to process that message in the message queue 235.

While the messaging queue service is discussed as being hosted on the messaging queue service provider device 230 that is illustrated as separate from the server computing devices 205a-205n and client computing devices 215a-215n, one of skill in the art in possession of the present disclosure will recognize that the messaging queue service provider device 230 may be provided by any of the client computing devices 215a-215n that host the applications 220a-220n. Also, the messaging queue service provider device 230 may be provided by one or more server computing devices 205a-205n hosting the applications 210a-210n, may be provided by multiple messaging queue service provider devices 230 that provide separate instances of the messaging queue service to one or more server computing devices 205a-205n and/or client computing devices 215a-215n, and/or may be included in a cluster messaging queue topology, a point-to-point messaging queue topology, and/or other messaging queue topologies that would be apparent to one of skill in the art in possession of the present disclosure while remaining in the scope of the present disclosure. The server computing devices 205a-205n, applications 210a-210n, client computing devices 215a-215n, and applications 220a-220n are illustrated as interacting through the network 225 with the message queue manager 240. However, the applications 210a-210n and 220a-220n and the message queue manager 240 may be provided on a single device, the application 210a may use the message queue manager 240 to communicate with itself and/or any other configurations that would be apparent to one of skill in the art in possession of the present disclosure.

In an embodiment of the database replication system 200, the database replication system 200 may include a shard database 245 such that any data that is received, generated, and/or otherwise obtained at the application(s) 210a-210n may be stored as shard data in the shard database 245, which uses a shard database architecture. Shard database architecture provides a type of horizontal database partitioning that separates very large databases into smaller parts called shards or database shards. Each shard may be mapped to a separate database instance. For example, each shard may be stored on a separate server computing device. When dividing a data store up into shards, a shard typically includes items that fall within a specified range determined by one or more attributes of the data. These attributes form a shard key (sometimes referred to as the partition key) and should be static.

Furthermore, sharding may physically organize the data. For example, when an application (e.g., the application(s) 210a-210n and/or 220a-220n) stores and retrieves data, sharding logic directs the application to the appropriate shard in the shard database 245. The sharding logic may be implemented as part of the data access code in the application, or the sharding logic may be implemented by the database replication system 200 if it transparently supports sharding. In various embodiments and discussed in more detail below, the message queue 235 may be provided in the shard database 245 to prevent some of the drawbacks of two-phase commit.

In an embodiment of the database replication system 200, the database replication system 200 may include a de-shard database 250 and/or any other database or file system that may require the shard data that is in the shard database to be in a single database instance that would be apparent to one of skill in the art in possession of the present disclosure. As discussed above, some applications may require access to a complete instance of the data that is stored as shard data in the shard database 245. For example, applications that use an ETL process, applications that search data using SQL IN queries as opposed to lookup, and/or applications that are configured with other data access queries that would be apparent to one of skill in the art in possession of the present disclosure may require a single instance of the shard database 245.

In various embodiments, the client computing devices 215a-215n, the server computing devices 205a-205n, and/or the messaging queue service provider device 230 may each include one or more processors, memories, and other appropriate components for executing instructions such as program code and/or data stored on one or more computer readable mediums to implement the various applications, data, and steps described herein. For example, such instructions may be stored in one or more computer readable mediums such as memories or data storage devices internal and/or external to various components of the database replication system 200, and/or accessible over the network 225. The network 225 may be implemented as a single network or a combination of multiple networks. For example, in various embodiments, the network 225 may include the Internet and/or one or more intranets, landline networks, wireless networks, and/or other appropriate types of networks. While a specific topology and computing devices are illustrated in the database replication system 200, one of skill in the art in possession of the present disclosure would recognize that the database replication system 200 may include other devices and topologies while still falling under the scope of the present disclosure.

Figure 3:
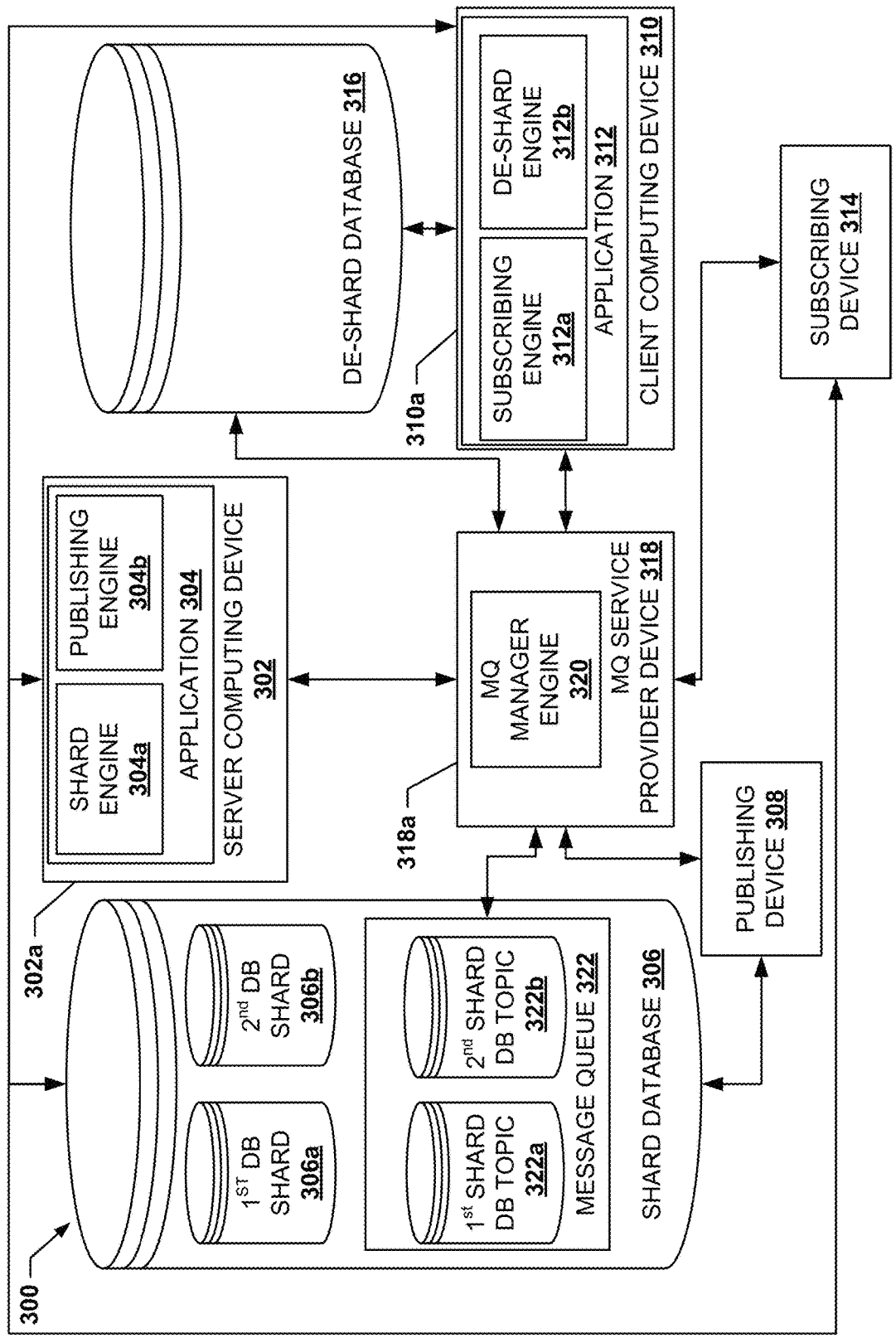
FIG. 3 is a schematic view illustrating embodiments of devices within the database replication system of FIG. 2.

Referring now to FIG. 3, an embodiment of a database replication system 300 is illustrated that may be included in the database replication system 200 of FIG. 2 discussed above. The database replication system 300 may include a server computing device 302 that may be any of the server computing devices 205a-205n of FIG. 2 discussed above. In the illustrated embodiment, the server computing device 302 includes a chassis 302a that houses the components of the server computing device 302, only some of which are illustrated in FIG. 3. For example, the server computing device 302 may house a processing system (not illustrated) and a non-transitory memory system (not illustrated) that includes instructions that, when executed by the processing system, cause the processing system to provide an application 304, which may be any of the applications 210a-210n discussed above and that is configured to perform the functions of the applications and server computing devices discussed below according to the method 100.

For example, the application 304 may include a shard engine 304a that is configured to shard data received, generated, and/or otherwise obtained by the application 304 and that is configured to perform the functions of the shard engines and server computing devices/publishing devices discussed below. The application 304 may also include a publishing engine 304b that is configured to publish messages to a message queue (e.g., the message queue 235 of FIG. 2) and that is configured to perform the functions of the publishing engines and server computing devices/publishing devices discussed below. While the database replication system 300 illustrates a server computing device 302, one of skill in the art in possession of the present disclosure would recognize that the database replication system 300 may include other computing devices (e.g., a publishing device 308) that may provide data sharding functionality and/or message publishing functionality and still fall under the scope of the present disclosure.

In the illustrated embodiment, the database replication system 300 also includes a storage device with a shard database 306 that may be the shard database 245 discussed above and that provides a first database shard 306a and a second database shard 306b that each stores a partition of the data. The shard database may be provided by, a network attached storage device (e.g., the shard database 245 of FIG. 2), a non-network attached computing device (e.g., a "cold storage" device), one or more other server computing devices, and/or any other device or storage system known in the art. While the shard database 306 is illustrated as being separate from the server computing device 302, such as, for example being coupled to the server computing device 302 over the network 225 of FIG. 2, one of skill in the art in possession of the present disclosure will recognize that the shard database 306 or a portion of the shard database 306 such as, for example, the first database shard 306a or the second database shard 306b may be provided in a storage device that is housed in the chassis 302a of the server computing device 302.

In the illustrated embodiment, the database replication system 300 may include a client computing device 310 that may be any of the client computing devices 215a-215n of FIG. 2 discussed above. In the illustrated embodiment, the client computing device 310 includes a chassis 310a that houses the components of the client computing device 310, only some of which are illustrated in FIG. 3. For example, the client computing device 310 may house a processing system (not illustrated) and a non-transitory memory system (not illustrated) that includes instructions that, when executed by the processing system, cause the processing system to provide an application 312, which may be any of the applications 220a-220n discussed above and that is configured to perform the functions of the applications and client computing devices discussed below according to the method 100. For example, the application 312 may include a subscribing engine 312a that is configured to subscribe to topics of a message queue (e.g., the message queue 235 of FIG. 2) and receive messages published to those topics from the message queue.

The subscribing engine 312a is configured to perform the functions of the subscribing engines and client computing devices/subscribing devices discussed below. The application 312 may include a de-shard engine 312b that is configured to de-shard data received, generated, and/or otherwise obtained by the application 312 from the message queue and that is configured to perform the functions of the de-shard engines and client computing devices/subscribing devices discussed below. While the database replication system 300 illustrates a client computing device 310, one of skill in the art in possession of the present disclosure would recognize that the database replication system 300 may include other computing devices (e.g., a subscribing device 314) that may provide data de-sharding functionality and/or message subscribing functionality and still fall under the scope of the present disclosure. Also, while discussed as a server computing device 302 and a client computing device 310, the server computing device 302 and/or the client computing device 310 may each perform client and/or server functionality and as such, may include a shard engine 304a, a publishing engine 304b, a subscribing engine 312a and/or a de-shard engine 312b.

In the illustrated embodiment, the database replication system 300 also includes a storage device with a de-shard database 316 that may be the de-shard database 250 discussed above and that replicates and provides a single database instance of the data provided in the first database shard 306a and the second database shard 306b. For example, the data stored in the first database shard 306a and the second database shard 306b may be replicated and stored together in the de-shard database 316 as a single database instance. The de-shard database 316 may be provided by, a network attached storage device (e.g., the shard database 245 of FIG. 2), a non-network attached computing device (e.g., a "cold storage" device), one or more other client and/or server computing devices, and/or any other device or storage system known in the art. While the de-shard database 316 is illustrated as being separate from the client computing device 310, such as, for example being coupled to the client computing device 310 over the network 225 of FIG. 2, one of skill in the art in possession of the present disclosure will recognize that the de-shard database 316 may be provided in a storage device that is housed in the chassis 310a of the client computing device 310.

In the illustrated embodiment, the database replication system 300 may include a messaging queue service provider device 318 that may be the messaging queue service provider device 230 of FIG. 2 discussed above. In the illustrated embodiment, the messaging queue service provider device 318 includes a chassis 318a that houses the components of the messaging queue service provider device 318, only some of which are illustrated in FIG. 3. For example, the messaging queue service provider device 318 may house a processing system (not illustrated) and a non-transitory memory system (not illustrated) that includes instructions that, when executed by the processing system, cause the processing system to provide a message queue manager engine 320. The message queue manager engine 320 which may be the messaging queue manager 240 discussed above and that is configured to perform the functions of the messaging queue managers, message brokers, and messaging queue service provider devices discussed below according to the method 100. While the database replication system 300 illustrates a messaging queue service provider device 318, one of skill in the art in possession of the present disclosure would recognize that the message queue manager engine 320 may be provided on any of the server computing device 302 and/or the client computing device 310, and still fall under the scope of the present disclosure.

In the illustrated embodiment, the database replication system 300 also includes a message queue 322 provided in the shard database 306 that may be the message queue 235 discussed above and that is configured to store messages generated by applications until those messages are retrieved by another application, and store any of the data that enables the functionality discussed below. The message queue manager engine 320, in a publish-subscribe message queue environment, may receive messages from the publishing engine 304b that includes data and that is assigned to a topic. The message queue manager engine 320 may store the messages according to the topic such that the subscribing engine 312a that subscribes to that topic may receive the data from the message queue 322. For example, the message queue 322 may include a first shard database topic 322a and a second shard database topic 322b that store messages for the first database shard 306a and the second database shard 306b, respectively.

In various embodiments, the message queue 322 may be provided in the shard database 306. Each shard database topic 322a may include a message queue table that is stored with its corresponding database shard (e.g., the shard database topic 322a may be stored in the device that stores the database shard 306a and the shard database topic 322b may be stored in the device that stores the database shard 306b). Storing a shard database topic with its corresponding database shard may prevent issues associated with two-phase commit, which may occur if the message queue 322 is provided in a separate database than that of the shard database 306. For example, if publishing a message to the message queue fails, then the update to the shard database 306 is not required to roll back the update to the shard database 306 and retry the update (e.g., a write to one of the database shards 306a and/or 306b). However, it is contemplated that the message queue 322 may be provided by, a network attached storage device (e.g., the shard database 245 of FIG. 2), a non-network attached computing device (e.g., a "cold storage" device), and/or one or more other client and/or server computing devices. In various embodiments, the message queue 322 may be provided within a storage device that is housed in the chassis 318a of the messaging queue service provider device 318 and that is coupled to the messaging queue manager engine 320 (e.g., via a coupling between the storage device and the processing system) and/or any other device or storage system known in the art that is distinct from the shard database and still benefit from the teachings of the present disclosure.

Referring back to FIG. 1, the method 100 begins at block 102 where an application receives instructions to change a shard database. In an embodiment of block 102, the application 304 may receive a request over the network 225 from one or more the client computing devices 215a-215n and/or server computing devices 205a-205n to add data and/or change a portion of shard data stored in the shard database 306. Specifically, the application 304 may receive an instruction to insert data as shard data to the shard database 306, update shard data stored in the shard database 306, delete shard data from the shard databases 306, and/or any other change to the shard database 306 that would be apparent to one of skill in the art in possession of the present disclosure. For example, the application 304 may be a payment application that is provided by a payment service provider on a payment service provider server. A user device may access the payment application via a web browser and provide a request to generate a user account. The request may include user information that a user of the user device provided such as, for example, a first name, a family name, an address, a phone number, bank account information, an email, and/or other user information that would be apparent to one of skill in the art in possession of the present disclosure. The request to generate a user account may cause the payment application to generate instructions to insert the user information as shard data in the shard database 306.

The method 100 may then proceed to block 104 where the application performs the instructions to change the shard database. In an embodiment of block 104, the shard engine 304a may perform the instructions on the shard database 306. The shard engine 304a may be implemented using Apache HBase™, MongoDB™, MySQL™, and/or any other database management system that provides sharding capabilities that would be apparent to one of skill in the art in possession of the present disclosure. The shard engine 304a may perform the instructions by inserting data to the shard database 306 as shard data if the data received by the application 304 is not present in the shard database 306. In other examples, the instructions may cause the shard engine 304a to update and/or remove existing shard data stored in the shard database 306. Based on the data and shard keys, the shard engine 304a may perform the instructions to the database shard 306a or the database shard 306b. In the example above where the application 304 is a payment application, the shard database 306 may provide the database shards 306a and 306b that are associated with a shard key based on a location attribute. For example, the first database shard 306a may be used to store user information of users in the western part of a country and the second database shard 306b may be used to store user information of users in the eastern part of the country. While the example discusses sharding data based on the location, one of skill in the art in possession of the present disclosure would recognize that the shard engine 304a may shard the data in shard database 306 according to other attributes.

The method 100 may then proceeds to block 106 where the application generates a message that captures the change to be recorded in the shard database. In an embodiment of block 106, the publishing engine 304b may generate a message that includes the changes to be recorded in the shard database 306. The publishing engine 304b may be configured to generate a message that is compatible with a message-oriented middleware service that provides the message queue manager engine 320. For example, the message queue manager engine 320 may be provided by a message-oriented middleware service such as IBM® WebSphere MQ™, IBM MQ™, RabbitMQ™, StormMQ™, Apache ActiveMQ™, Java Message Service™ (JMS), Microsoft Message Queuing™ (MSMQ), and/or other message-oriented middleware services that would be apparent to one of skill in the art in possession of the present disclosure.

Figure 4:
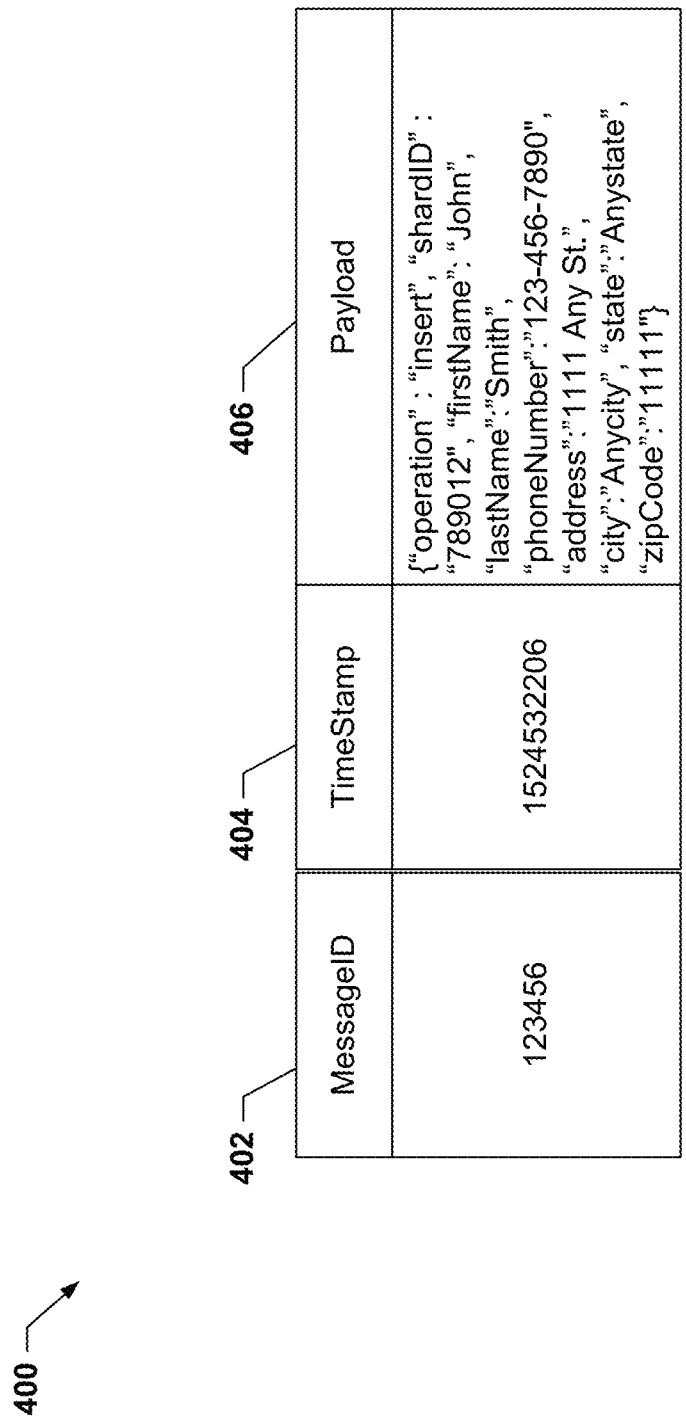
FIG. 4 is a data structure illustrating an example of a message provided in the database replication system of FIGS. 2 and 3.

Referring now to FIG. 4, an example message 400 generated by the publishing engine 304b is illustrated. The message may include a message identifier 402, a timestamp 404, a payload 406, and/or any other message information that would be apparent to one of skill in the art in possession of the present disclosure. The payload 406 may include the type of operation that is being performed to the data being provided to the shard database 306 to implement the change. For example, the operation may be "insert." The payload 406 may also include the data that is being inserted into the shard database 306 as shard data and a shard identifier that identifies the corresponding shard data stored in the shard database 306. In the illustrated example, the data included in the payload 406 may include user information that may include a first name, a last name, a phone number, and an address. While a specific example of a message is illustrated, one of skill in the art in possession of the present disclosure would recognize that the message 400 may be of other formats and still fall under the scope of the present disclosure.

The method 100 may then proceed to block 108 where the application publishes the message to a message queue. In an embodiment of block 108, the publishing engine 304b may publish the message to the message queue 322. The message may be published to the message queue in a single transaction commit and/or any other publishing technique that guarantees at least once delivery of a message and that makes the replication reliable. By making the message transactional, the shard data destined for one of the database shards 306a or 306b and the message associated with the shard data that is destined to a corresponding shard database topic 322a or 322b is sent to the shard database 306 as a single database transaction. In a non-transactional message queuing scenario, publishing the message and writing the shard data may be separate events. In a non-transactional situation, one of the shard data writing or the publishing of the message may fail which requires the rollback of one that did not fail and adds complexity to the system. Thus, blocks 104 and 108 of the method 100 may occur simultaneously in a signal transaction.

When publishing, the publishing engine 304b may publish the message with a topic string and provide the message to the message queue manager engine 320 that may store the message in the message queue 322. If the data that was provided to the shard database 306 is stored in the database shard 306a, the message queue manager engine 320 may store the message in the shard database topic 322a of the message queue 322 that is associated with the database shard 306a provided that the publishing engine 304b published the message with a first shard database topic. However, if the data that was provided to the shard database 306 is stored in the database shard 306b and the publishing engine 304b published the message with a second shard database topic, the message queue manager engine 320 may store the message in the shard database topic 322b of the message queue 322 that is associated with the database shard 306b.

The method 100 may then proceed to block 110 where an application obtains the message from the message queue. In an embodiment of block 110, a subscribing engine 312a provided by the application 312 of the client computing device 310 may obtain the message from the message queue 322. Prior to the message being received in the message queue 322, the subscribing engine 312a may have subscribed via the message queue manager engine 320 to one or more topics such as, for example, the shard database topic 322a and the shard database topic 322b. However, in other embodiments, it is contemplated that the message may remain in the message queue 322 and the subscribing engine 312a may register for the topic that is associated with the message after the message has been provided to the message queue 322 from the application 304.

In an embodiment, after the message queue manager engine 320 has received the message from the publishing engine 304b and stored the message in the message queue 322, the message queue manager engine 320 may determine whether there are any subscribers subscribed to the topic string provided with the message from the publishing engine 304b. The message queue manager engine 320 may then send those messages to the various subscribing engines (e.g., subscribing engine 312a) that are subscribed to the topic of the message. For example, the message queue manager engine 320 may provide the messages from the shard database topic 322*a* and the shard database topic 322*b* to the subscribing engine 312*a* when the subscribing engine 312*a* is subscribed to both of those topics. However, if the subscribing engine 312*a* is only subscribed to the shard database topic 322*a*, then the message queue manager engine 320 may only provide messages to the subscribing engine 312*a* that are queued in the shard database topic 322*a* and not shard database topic 322*b*.

In various embodiments, the message queue manager engine 320 may store the message in the message queue 322 and may provide the message to the subscribing engine 312*a* when the subscribing engine 312*a* polls the message queue manager engine 320 for messages of a topic. For example, the subscribing engine 312*a* may periodically poll the message queue manager engine 320 for message assigned to the first shard database topic 322*a* and the second shard database topic 322*b*. The message queue manager engine 320 may provide those messages of those topics to the subscribing engine 312*a*. In an embodiment, the message queue manager engine 320 may guarantee that the message is received at least once by the subscribing engine 312*a* and any other subscriber that subscribes to the topic with which the message is associated.

The method 100 may then proceed to decision block 112 where the application determines whether the de-shard database includes de-shard data that corresponds to the data in the message. In an embodiment of block 112, the de-shard engine 312*b* may be configured to process the message based on the type of message. For example, the de-shard engine 312*b* may be configured to provide at least one message handler for each topic subscribed. For example, there may be 12 message handlers for the first shard database topic 322*a* and 9 message handlers for the second shard database topic 322*b*; however other numbers of message handlers would be apparent to one of skill in the art in possession of the present disclosure. Message handlers are configured to process the message. Each message handler may process the message in different manners. For example, a first message handler may perform a one-to-one replication to similar database, a second message handler may perform a custom replication by transforming the data before writing to the de-shard database 316, a third message handler may write message data as de-shard data to NO-SQL database or a file system. In addition, the de-shard engine 312*b*, via a message handler, may process the message by determining whether there is de-shard data in the de-shard database 316 that corresponds to the message data provided in the message.

For example, the de-shard engine 312*b* may attempt to read shard data from the shard database 306 based on a shard identifier that is provided in the message. If the shard data is present in the shard database 306, then the de-shard engine 312*b* may attempt to retrieve de-shard data stored in the de-shard database 316 that corresponds to the message data by making a call to the de-shard database 316 using the shard identifier that is provided in the message 400. If the message data includes all of the shard data, then it may not be necessary for the de-shard engine 312*b* to read shard data from the shard database 306. However, if the message includes partial content of the shard data, then the de-shard engine 312*b* may attempt to read shard data from the shard database 306 based on a shard identifier that is provided in the message. If de-shard data that corresponds to the message data is not present in the de-shard database 316, the method 100 may proceed to block 114 where the de-shard engine 312*b* may insert the message data as de-shard data in the de-shard database 316.

Returning to decision block 112, if de-shard data that corresponds to the message data is present in the de-shard database 316, then the method 100 may proceed to decision block 116 where a determination is made as to whether the shard data stored in the shard database is more current than the de-shard data stored in the de-shard database that corresponds to the shard data in the shard database. For example, each time the shard data is updated in the shard database 306, the shard engine 304*a* may update a version number associated with the shard data (e.g., increase the version from version "1" to version "2"). Similarly, when the de-shard engine 312*b* updates de-shard data stored in the de-shard database 316, the de-shard engine 312*b* may update a version number associated with the de-shard data. However, prior to updating the de-shard data stored in the de-shard database 316 and the version, the de-shard engine 312*b* may compare the version of the shard data in the shard database 306 that is associated with the message data to the version of the de-shard data in the de-shard database 316 that is associated with the message data. If the version of the shard data indicates that the shard data is more current than the de-shard data, then the method 100 may proceed to block 118 where the de-shard data that corresponds to the message data of the message is updated with the message data. However, if the version of the de-shard data indicates the de-shard data is more current than the shard data or is the same as the shard data, then the method 100 will proceed to block 120 where the de-shard engine 312*b* ignores the message.

The method 100 may then proceed to decision block 122 where a determination is made as to whether the message processing is successful. In an embodiment of block 122, the application 312 may determine whether the processing of the message obtained at block 110 is successful. The message processing by the application 312 may fail at blocks 112-120 of method 100. For example, during block 112, the application 312 may fail to properly read the shard data from the shard database 306. In another example, during block 114, the application 312 may fail to insert the message data as de-shard data in the de-shard database 316. In yet another example, the application 312 may fail to update the de-shard data in the de-shard database 316 with the message data. While specific examples of the application 312 failing to change the de-shard database are discussed above, one of skill in the art in possession of the present disclosure would recognize that the message processing by the application 312 may fail for other reasons.

If the message processing is successful at decision block 122, then the method 100 may proceed to block 124, where the application provides a success notification to the message queue manager. In an embodiment of block 122, the application 312 may provide a success notification to the message queue manager engine 320 when the application 312 successfully changes the de-shard database with the message data provided in the message. In an example, the application 312 may provide a success notification to the message queue manager engine by moving the message to a DM table included in the de-shard database 316 from which the message queue manager engine 320 polls periodically. The DM table may be a subscriber specific table used to store some of the message properties after the message has been processed. The message queue manager engine 320 may then delete the message after all subscribers (e.g., the subscribing device 314 and the client computing device 310) of the message have indicated that they processed the message successfully.

If the message processing fails at decision block 122, then the method 100 may proceed to block 126, where a determination is made as to whether the message processing has failed based on a predetermined threshold. In an embodiment of block 126, the application 312 may determine whether the number of times that the application 312 has processed the message has exceeded a predetermined threshold. For example, the application 312 may determine the number of times it has tried to process the message and compare that number to a predetermined threshold (e.g., 3 retries, 4 retries, 7 retries, and/or any other number of retries that would be apparent to one of skill in the art in possession of the present disclosure).

If the predetermined threshold has not been exceeded, the method 100 proceeds to block 128, where the application provides a retry notification to the message queue manager. In an embodiment of block 128, the application 312 may provide to the message queue manager 320 a retry notification. The retry notification may include a reason for the retry. For example, the retry notification may be a shard read exception retry notification indicating that a read of the shard database 306 failed and/or an insert/create exception retry notification indicating that inserting or creating de-shard data in the de-shard database 316 from the message data failed. In other examples, the retry notification may be an update exception retry notification indicating the application 312 failed to update de-shard data with the message data and/or any other retry notification that would be apparent to one of skill in the art in possession of the present disclosure. In an example, the application 312 may provide a retry notification to the message queue manager engine 320 by moving the message to a retry queue (RQ) table included in the de-shard database 316 from which the message queue manager engine 320 polls periodically. The method 100 may then proceed back to block 110 where the message is again obtained from the message queue 322.

If, at decision block 126, the retry threshold has been satisfied, then the method 100 proceeds to block 130 where an exception notification is provided to the message queue manager. In an embodiment of block 130, the application 312 may provide to the message queue manager engine 320 an exception notification. In an example, the application 312 may provide an exception notification to the message queue manager engine 320 by moving the message to an exception (EX) table included in the de-shard database 316 from which the message queue manager engine 320 polls periodically. In various embodiments, once the message is provided in the exception table, the application 312 and/or the message queue manager engine 320 may provide an alert to an administrator of the message being added to the exception table. For example, the alert may be provided in an event log. The alert may include the topic (e.g., shard database topic 322a or shard database topic 322b) in which the message was stored, the message identifier, a timestamp at which the message was dequeued from the message queue 322, and/or any other information that may be apparent to one of skill in the art in possession of the present disclosure.

Other events, information, and/or notifications that may be provided to an administrator may include a latency notification, a CPU usage notification, a memory usage notification, an insert de-shard event when successful insert of de-shard data occurs, an update de-shard event when a successful update to de-shard data occurs, a not found event when shard data is not found in the shard database 306.

Other events, information, and/or notifications provided to the administrator may also include an ignore update event when the application 312 ignores a message, a stale update event when an application encounters a message that provides data of a less current version of the de-shard data, and/or a missed update event if there is a jump in more than one update version of the de-shard data and the message data. While specific examples of events, information, and/or notifications provided to the administrator have been discussed, any other events, notifications, and/or information that would be apparent to one of skill in the art in possession of the present disclosure will fall under the scope of the present disclosure.

Figure 5:
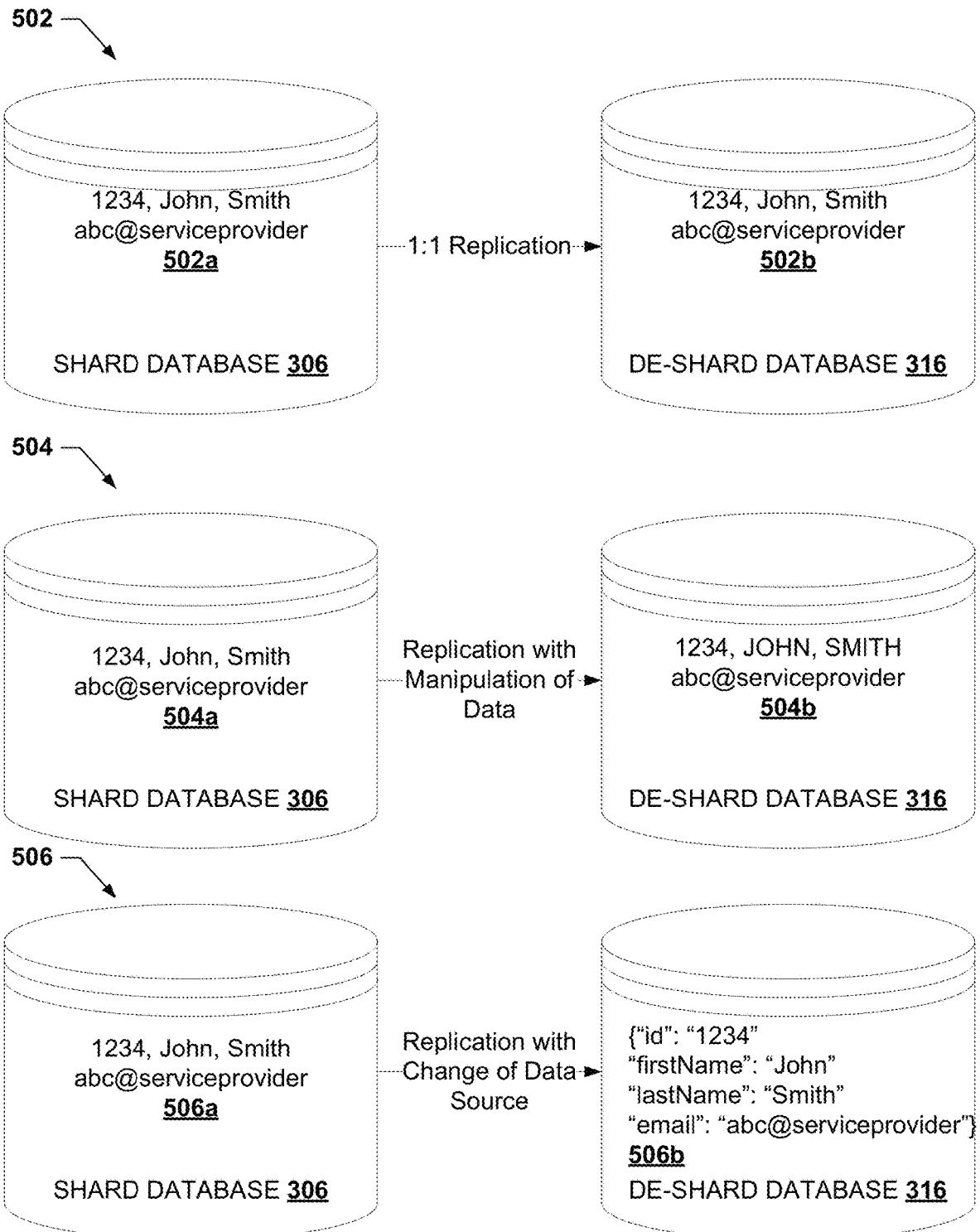
FIG. 5 is a flow diagram illustrating examples of customizable replications of the shard data to de-shard data.

In various embodiments of block 114 and block 118 of method 100, the application 312 may modify the message data included in the message to provide modified de-shard data such that the de-shard data in the de-shard database 316 includes the modified de-shard data. Due to the application 312 that changes the de-shard database 316 being separate from the application 304 that changes the shard database 306, the application 312 may be configured to perform modifications to the message data that is received from the message queue 322 without affecting the shard databases 306. For example, the de-shard database 316 may provide a different schema, a different file system, or database service than that of the shard database 306. Referring now to FIG. 5, a one-to-one data replication scenario 502, a data manipulation scenario 504, and a data source change scenario 506 are illustrated. Referring to the one-to-one data replication scenario 502, the application 312 may replicate the message data such that the shard data 502a matches the de-shard data 502b.

In the data manipulation scenario 504, the application 312 may replicate the message data with a modification such that the shard data 504a is different than the de-shard data 504b. In the illustrated example, the application 312 may modify the name information in the message data to all capital letters and store the modified message data as the de-shard data 504b. In the data source change scenario 506, the application 312 may replicate the message data with a modification such that the de-shard data 506b is provided in a different schema or structure than the shard data 506a. In the illustrated example, the application 312 may modify the message data so that the message data is stored as de-shard data 506b according to how the de-shard database 316 stores de-shard data 506b due to the de-shard database 316 providing a different schema, a file system, and/or is provided by a different database service than the shard database 306.

In various embodiments, the application 312 and/or the client computing device 310 may provide a validating engine. The validating engine may be configured to ensure the shard data of the shard database 306 matches the corresponding de-shard data in the de-shard database 316 after the method 100 has completed. The validating engine may use the shard data identifier to call the records of the shard data and the de-shard data, determine whether the records of the shard data and/or the de-shard data exist, and compare the shard data and the de-shard data to each other. The validating engine may then provide a notification to an administrator that identifies whether the shard data and the de-shard data match.

Thus, methods and systems have been provided for database replication. A message queue may be established that includes published messages from an application. The messages may include message data that corresponds to changes to shard data stored in a shard database made by the application. From the message data, a subscribing application to the published messages may obtain the messages from the message queue and make those changes to a de-shard database that is a single database instance of database shards provided in the shard database. This provides an improved database replication system that is less complex, has lower latency and is more efficient when compared to conventional database replication systems and also allows for customized replication of the data to the de-shard database when the de-shard database requires manipulation of the data or a different schema than that of the shard database.

Figure 6:
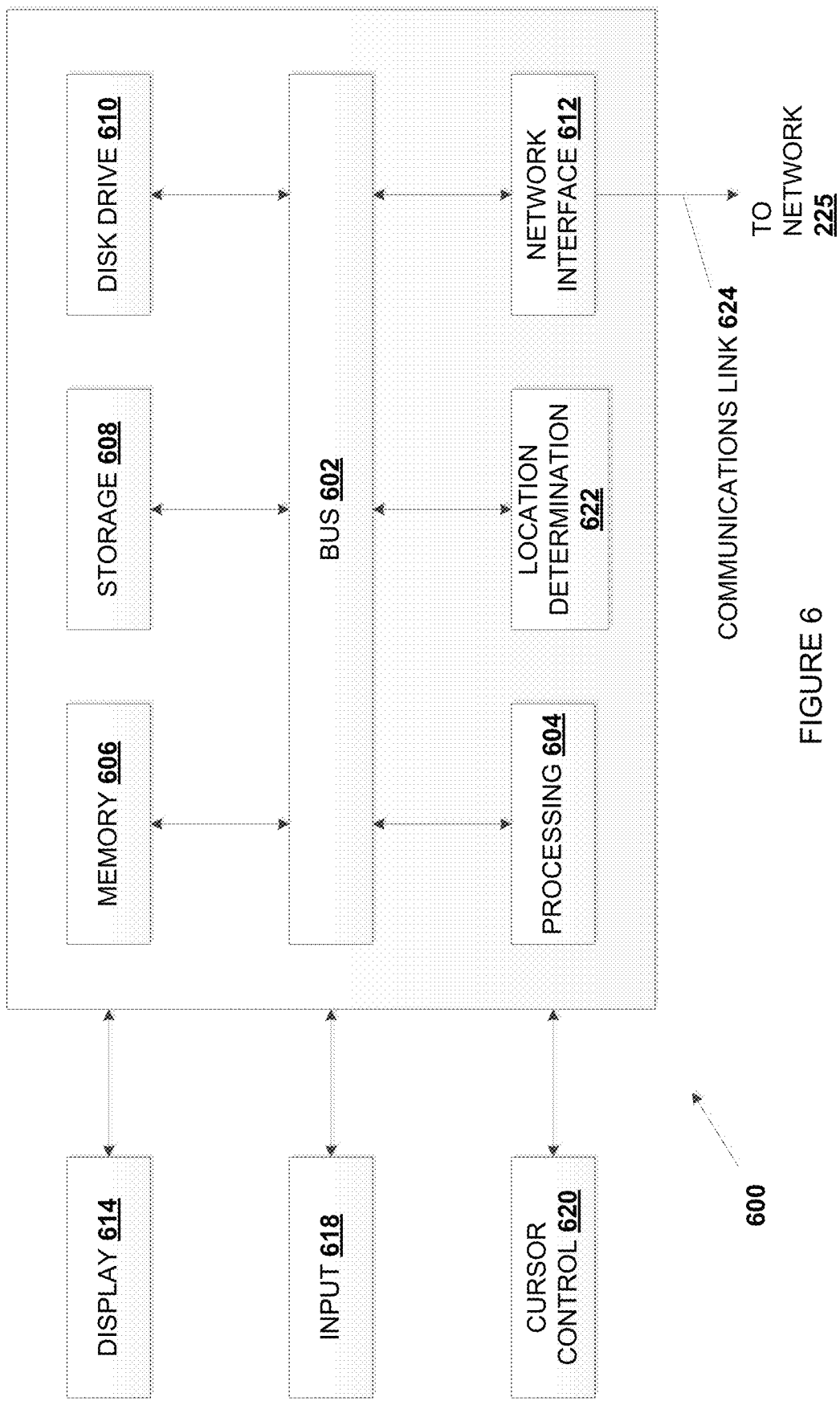
FIG. 6 is a schematic view illustrating an embodiment of a computer system.

Referring now to FIG. 6, an embodiment of a computer system 600 suitable for implementing, for example the client computing devices 215a-215n and 310, the server computing devices 205a-205n and 302, and/or the messaging queue service provider device 230 and 318, is illustrated. It should be appreciated that other devices utilized in the database replication system 200 discussed above may be implemented as the computer system 600 in a manner as follows.

In accordance with various embodiments of the present disclosure, computer system 600, such as a computer and/or a network server, includes a bus 602 or other communication mechanism for communicating information, which interconnects subsystems and components, such as a processing component 604 (e.g., processor, micro-controller, digital signal processor (DSP), etc.), a system memory component 606 (e.g., RAM), a static storage component 608 (e.g., ROM), a disk drive component 610 (e.g., magnetic or optical), a network interface component 612 (e.g., modem or Ethernet card), a display component 614 (e.g., CRT or LCD), an input component 618 (e.g., keyboard, keypad, or virtual keyboard), a cursor control component 620 (e.g., mouse, pointer, or trackball), and/or a location determination component 622 (e.g., a Global Positioning System (GPS) device as illustrated, a cell tower triangulation device, and/or a variety of other location determination devices known in the art). In one implementation, the disk drive component 610 may comprise a database having one or more disk drive components.

In accordance with embodiments of the present disclosure, the computer system 600 performs specific operations by the processor 604 executing one or more sequences of instructions contained in the memory component 606, such as described herein with respect to the client computing devices 215a-215n and 310, the server computing devices 205a-205n and 302, and/or the messaging queue service provider device 230 and 318. Such instructions may be read into the system memory component 606 from another computer readable medium, such as the static storage component 608 or the disk drive component 610. In other embodiments, hard-wired circuitry may be used in place of or in combination with software instructions to implement the present disclosure.

Logic may be encoded in a computer readable medium, which may refer to any medium that participates in providing instructions to the processor 604 for execution. Such a medium may take many forms, including but not limited to, non-volatile media, volatile media, and transmission media. In one embodiment, the computer readable medium is non-transitory. In various implementations, non-volatile media includes optical or magnetic disks, such as the disk drive component 610, volatile media includes dynamic memory, such as the system memory component 606, and transmission media includes coaxial cables, copper wire, and fiber optics, including wires that comprise the bus 602. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. In one embodiment, the computer readable media is non-transitory.

In various embodiments of the present disclosure, execution of instruction sequences to practice the present disclosure may be performed by the computer system 600. In various other embodiments of the present disclosure, a plurality of the computer systems 600 coupled by a communication link 624 to the network 225 (e.g., such as a LAN, WLAN, PTSN, and/or various other wired or wireless networks, including telecommunications, mobile, and cellular phone networks) may perform instruction sequences to practice the present disclosure in coordination with one another.

The computer system 600 may transmit and receive messages, data, information and instructions, including one or more programs (i.e., application code) through the communication link 624 and the network interface component 612. The network interface component 612 may include an antenna, either separate or integrated, to enable transmission and reception via the communication link 624. Received program code may be executed by processor 604 as received and/or stored in disk drive component 610 or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system for database replication, comprising:
a non-transitory memory; and
one or more hardware processors coupled to the non-transitory memory and configured to read instructions from the non-transitory memory to cause the system to perform operations comprising:
accessing a message queue through a messaging queue manager;
obtaining a message, provided by a publishing application, from the message queue, wherein the message comprises message data that corresponds to shard data stored in a database shard of a plurality of database shards provided by a shard database, wherein data stored in the shard database are horizontally partitioned across the plurality of database shards; and
providing the message data included in the message to a de-shard database as de-shard data, wherein the de-shard data is a replication of the shard data, and wherein the de-shard database provides a single database instance of the plurality of database shards.

2. The system of claim 1, wherein the operations further comprise:
prior to the providing the message data included in the message to the de-shard database as the de-shard data, modifying the message data included in the message, wherein the de-shard data includes the modified message data.

3. The system of claim 2, wherein the modifying the message data included in the message includes changing a schema of the message data such that the de-shard data has a different schema than the shard data.

4. The system of claim 2, wherein the modifying the message data included in the message includes manipulating the message data such that the de-shard data is different than the shard data.

5. The system of claim 1, wherein the operations further comprise:
determining that the de-shard database does not include stored de-shard data that corresponds to the shard data, wherein the providing the message data is in response to the determining that the de-shard database does not include the stored de-shard data.

6. The system of claim 1, wherein the operations further comprise:
determining that a version of the shard data is more current than a version of stored de-shard data that corresponds to the shard data, wherein the providing the message data is in response to the determining that the version of the stored shard data is more current than the version of the stored de-shard data.

7. The system of claim 6, wherein the providing comprises updating the version of the stored de-shard data with the version of the shard data included in the message.

8. The system of claim 1, wherein the operations further comprise:
determining that the providing the message data fails, and in response, causing the messaging queue manager to move the message to a retry queue such that the message is obtained again.

9. The system of claim 8, wherein the operations further comprise:
determining that the message fails a predetermined number of times, and in response, causing the messaging queue manager to move the message to an exception queue.

10. The system of claim 1, wherein the operations further comprise:
validating that the de-shard data in the de-shard database corresponds to the shard data in the shard database.

11. The system of claim 1, wherein the message queue is provided in the shard database, and wherein the publishing application provides a change to the shard data in the shard database and provides the message to the message queue that indicates the change to the shard data in a single transaction.

12. A method of database replication, comprising:
accessing, by a subscribing application, a message queue through a messaging queue manager;
obtaining, by the subscribing application, a message, provided by a publishing application, from the message queue, wherein the message comprises message data that corresponds to shard data stored in a database shard of a plurality of database shards provided by a shard database, wherein data stored in the shard database are horizontally partitioned across the plurality of database shards; and
providing, by the subscribing application, the message data included in the message to a de-shard database as de-shard data, wherein the de-shard data is a replication of the shard data, and wherein the de-shard database provides a single database instance of the plurality of database shards.

13. The method of claim 12, further comprising:
prior to the providing the message data included in the message to the de-shard database as the de-shard data, modifying, by the subscribing application, the message data included in the message, wherein the de-shard data includes the modified message data, wherein the modifying the message data includes at least one of:
changing a schema of the message data such that the de-shard data has a different schema than the shard data, and
manipulating the message data such that the de-shard data is different than the shard data.

14. The method of claim 12, further comprising:
determining, by the subscribing application, that the de-shard database does not include stored de-shard data that corresponds to the shard data in the shard database, wherein the providing the message data is in response to the determining that the de-shard database does not include the stored de-shard data.

15. The method of claim 12, further comprising:
determining, by the subscribing application, that a version of the shard data is more current than a version of stored de-shard data that corresponds to the shard data, wherein the providing the message data is in response to the determining that the version of the shard data is more current than the version of the stored de-shard data.

16. The method of claim 12, further comprising:
determining, by the subscribing application, that the providing the message data fails, and in response, causing, by the subscribing application, the messaging queue manager to move the message to a retry queue such that the message is obtained again.

17. A system implemented at least partially by hardware for database replication, the system comprising:
a shard database that includes a plurality of database shards that store shard data, wherein the shard data stored in the shard database are horizontally partitioned across the plurality of database shards;
a messaging queue service provider device;

a publishing device that is coupled to the shard database and the messaging queue service provider device, wherein the publishing device is configured to perform operations comprising:
   receiving instructions to change the shard data in the shard database;
   changing the shard data in a database shard of the plurality of database shards according to the instructions;
   generating a message that captures the change the shard data, wherein the message comprises message data that corresponds to the shard data stored in the database shard; and
   publishing the message to a message queue managed by a message queue manager provided by the messaging queue service provider device;
a de-shard database that provides a single database instance of the plurality of database shards of the shard database; and
a subscribing device that is coupled to the messaging queue service provider device and the de-shard database, wherein the subscribing device is configured to perform the operations comprising:
   accessing the message queue through the messaging queue manager;
   obtaining the message from the message queue; and
   providing the message data included in the message to the de-shard database as de-shard data.

18. The system of claim 17, wherein the subscribing device is configured to perform operations that further comprise:
   prior to the providing the message data included in the message to the de-shard database as the de-shard data, modifying the message data included in the message, wherein the de-shard data includes the modified message data.

19. The system of claim 18, wherein the modifying the message data included in the message includes at least one of:
   changing a schema of the message data such that the de-shard data has a different schema than the shard data; and
   manipulating the message data such that the de-shard data is different than the shard data.

20. The system of claim 17, wherein the subscribing device is configured to perform operations that further comprise:
   determining that the de-shard database does not include stored de-shard data that corresponds to the shard data in the shard database, wherein the providing the message data is in response to the determining that the de-shard database does not include the stored de-shard data.

* * * * *